United States Patent
Suzuki et al.

(10) Patent No.: US 6,799,431 B2
(45) Date of Patent: *Oct. 5, 2004

(54) COMPRESSOR AND REFRIGERANT SYSTEM DEVICE USING THE SAME

(75) Inventors: Masaaki Suzuki, Osaka (JP); Fumitoshi Nishiwaki, Nishinomiya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/616,920

(22) Filed: Jul. 11, 2003

(65) Prior Publication Data

US 2004/0083743 A1 May 6, 2004

Related U.S. Application Data

(63) Continuation of application No. 10/110,721, filed as application No. PCT/JP00/07391 on Oct. 23, 2000, now Pat. No. 6,598,421.

(30) Foreign Application Priority Data

Oct. 26, 1999 (JP) .......................................... 11-303636

(51) Int. Cl.$^7$ ................................................ F25B 1/00
(52) U.S. Cl. ........................................ 62/114; 252/68
(58) Field of Search ........................... 62/114, 467, 468; 252/67, 68

(56) References Cited

U.S. PATENT DOCUMENTS

| | | | |
|---|---|---|---|
| 6,044,660 A | 4/2000 | Numoto et al. ................ 62/468 |
| 6,085,544 A | 7/2000 | Sonnekalb et al. | |
| 6,189,322 B1 | 2/2001 | Ishihara et al. ................ 62/114 |
| 6,598,421 B1 * | 7/2003 | Suzuki et al. .................. 62/498 |

FOREIGN PATENT DOCUMENTS

| | | |
|---|---|---|
| CN | 1031758 C | 5/1996 |
| CN | 1197188 A | 10/1998 |
| CN | 1207803 A | 2/1999 |
| CN | 1227907 A | 9/1999 |
| JP | 5-17792 | 1/1993 |
| JP | 9-100363 A | 4/1997 |
| JP | 9-149576 A | 6/1997 |
| JP | 9-286867 A | 11/1997 |
| JP | 10-126994 A | 5/1998 |
| JP | 10-159730 A | 6/1998 |
| JP | 11-92577 A | 4/1999 |
| JP | 11-150930 A | 6/1999 |
| JP | 11-248271 | 9/1999 |

* cited by examiner

Primary Examiner—Cheryl J. Tyler
Assistant Examiner—Malik N. Drake
(74) Attorney, Agent, or Firm—McDermott Will & Emery LLP

(57) ABSTRACT

The present specification discloses a compressor characterized in that a nonpolar solvent is used as a working fluid and an insulation part of a rotating section is formed from a low dielectric constant plastic film having a specific dielectric constant of 1.2 to 3.0. This compressor has been reduced in leakage current and improved in safety and reliability, and therefore can realize energy savings for devices such as a refrigerant system device.

12 Claims, 3 Drawing Sheets

US 6,799,431 B2

COMPRESSOR AND REFRIGERANT SYSTEM DEVICE USING THE SAME

RELATED APPLICATIONS

This application is a continuation of U.S. patent application Ser. No. 10/110,721, filed Apr. 15, 2002, now U.S. Pat. No. 6,598,421, which is a 35 USC 371 application of PCT/JP00/07391, filed Oct. 23, 2000, and a co-pending application Ser. No. 10/616,974, filed Jul. 11, 2003.

TECHNICAL FIELD

The present invention relates to a compressor equipped with a rotator having an insulation part employing a plastic film of a low dielectric constant. By using a compressor of the present invention, particularly, for refrigerant system devices such as freezing, refrigeration and air conditioning devices, each of which utilizes alternative refrigerants of chlorofluorocarbon refrigerants, it is possible to achieve excellent insulating property and the energy serving effect thereof.

BACKGROUND ART

In refrigerant system devices used for refrigeration, freezing, air conditioning and the like, chlorine element-free alternative refrigerants have begun to be employed as a working fluid in terms of the fact that the ozone layer destruction due to chlorofluorocarbon refrigerants used as the working fluid contributes to the global environmental problem. As such alternative refrigerants, for example, hydrofluorocarbon (HFC) type alternative chlorofluorocarbon refrigerants comprising hydrogen, fluorine and carbon are being used.

Also, from the viewpoint of preventing the global warming, energy savings are desired for electric and electronic equipment, and energy-saving measures are being investigated for the respective pieces of the equipment. In compressors used for refrigerant system devices, the inverter control system permitting the precise control of rotators is increasingly being employed in order to improve the operation efficiency. As a result, high frequency components in the leakage current are increased in the electrical insulation part, so that the energy-saving efficiency is reduced by the increased leakage current. In order to prevent this, it is desired to improve the insulating property of the insulating material.

Among electrically insulating materials, plastic films have high insulating property, and thus are applied to electronic and electric equipment as those parts and members which are required to be reliable. For example, they are applied to: an insulating material for covering a cable; a printed circuit board; and a slot insulation part of a rotator. Additionally, they are applied to electronic parts such as a film capacitor. In the case of the rotator, plastic films have been widely used for: a slot insulation part, which is a groove provided in an iron core for housing a field coil; a slot spacer; a wedge; an outer jacket and the like. Among such insulating plastic films, a polyester film such as polyethylene terephthalate (PET) is being used as a general-purpose film in terms of its excellent insulating property, heat resistance, moldability, cost effectiveness and the like.

Herein, FIG. 3 shows a schematic transverse sectional view of an iron core included in a rotator of a compressor, and FIG. 4 shows a schematic partial perspective view of the iron core. As shown in FIGS. 3 and 4, an iron core 1 is provided with a plurality of slots 5. A coil will be wound around the slot 5.

However, in these days of increasing numbers of pieces of equipment employing high frequency, high frequency components in the leakage current are increasing; therefore, a method is recently being sought after, by which the dielectric constant of the insulation part is decreased to lower the electrical capacity and thereby reducing the leakage current. For example, one method is available, by which the thickness of the insulation part is increased in order to lower the electrical capacity; however, the use of this method for the insulation of the slot reduces the utilization of an iron core slot, as a result of which the important characteristics of the rotator, such as the size, weight and efficiency, must be sacrificed.

In order to solve this problem from the viewpoint of the insulating material, materials having a low dielectric constant may be selected. The specific dielectric constants of typical plastics are as follows: polyethylene terephthalate (PET), which is an engineering plastic with excellent heat resistance, has a dielectric constant of about 3.1; polyimide (PI) has a dielectric constant of about 3.3; polyethylene (PE) with a low dielectric constant has a dielectric constant of about 2.3; and polytetrafluoroethylene (PTFE) with the least dielectric constant has a dielectric constant of about 2.1.

In general, the dielectric constant of a material is determined by the molecular structure of the material and the dielectric constant depends upon the material, so that each material has its inherent dielectric constant. Accordingly, the bulk dielectric constant of plastic has its limit. In addition, it is necessary that other practical properties such as processability and heat resistance also be satisfied. For example, although a fluorocarbon resin such as PTFE, which is excellent in term of the low dielectric constant, has sufficient heat resistance, it has problems of high cost and poor moldability. Also, an olefin resin such as PE has a heat resistance temperature of up to around 100° C., and therefore does not have sufficient heat resistance to be applied to the rotator.

Moreover, as a method for reducing high frequency components in the leakage current from the viewpoint of the material, a method which employs a porous polyester film as an electrical insulating material is disclosed in JP-A-9-100363. This method forms a void inside the film to reduce the density of the film; thereby achieving an effect of reducing the dielectric constant. Then, the use of the low dielectric constant polyester film disclosed in JP-A-9-100363 as the electrical insulating material for the rotator produces an effect of reducing the leakage current.

However, in the case where this rotator is installed in a compressor used for a refrigerant system device or the like, the working fluid such as a refrigerant should be taken into account when considering the effect. Particularly, since the rotator is disposed in a working fluid in the case of a closed-type compressor, the dielectric constant of the working fluid exerts an influence on the effect, unlike the case where the atmosphere is air (having a specific dielectric constant of 1). For example, when an HFC type alternative chlorofluorocarbon refrigerant is used as the refrigerant of this working fluid, the dielectric constant of the atmosphere in which the rotator is disposed is increased, since this refrigerant is polar. For this reason, even when the leakage current is decreased owing to the rotator employing a low dielectric constant plastic film for the insulation part, this effect is reduced because the working fluid, unlike the air, causes an increase in an electrical capacity of the compressor as a whole.

Therefore, it is an object of the present invention, for the purpose of realizing energy savings for a refrigerant system device and the like, to reduce the leakage current in a compressor used for the refrigerant system device thereby to improve the safety and reliability.

DISCLOSURE OF INVENTION

The present invention relates to a compressor in which a nonpolar refrigerant is used as a working fluid and a low dielectric constant plastic film having a specific dielectric constant of 1.2 to 3.0 is used for an insulation part of a rotator.

The nonpolar refrigerant preferably contains a hydrocarbon compound as the main component, and an effect of reducing the leakage current is sufficiently exerted when it contains at least one of propane and isobutane. The effect can also be sufficiently achieved when the nonpolar refrigerant is carbon dioxide.

Further, the effect is sufficiently exerted when the working fluid contains a lubricating oil, and a nonpolar oil is used as the lubricating oil. A mineral oil is suitable for use as the nonpolar oil.

As the low dielectric constant plastic film, a polyester film having pores therein is preferably used. In this film, the pore volume ratio is preferably 10 to 95 vol %. Further, in this film, the mean pore size of the pores is preferably 0.1 to 10 $\mu$m.

Additionally, as the low dielectric constant plastic film, a fluorocarbon resin film is also preferably used.

Further, as the low dielectric constant plastic film, a laminated composite film comprising a base film having a low dielectric constant and an auxiliary film having a higher dielectric constant than the base film is also suitable for use.

In particular, it is preferred that the low dielectric constant plastic film have a specific dielectric constant of 2.0 to 2.8.

Furthermore, a suitable configuration for the insulation part of the rotator of the compressor is such that an insulation part for insulating a field coil and a slot is formed from the low dielectric constant plastic film, particularly, in an iron core of the rotator.

By applying a compressor having the above-described configuration to a refrigerant system device, the effect of reducing the leakage current of the device itself is sufficiently exerted.

BEST MODE FOR CARRYING OUT THE INVENTION

Figure 1:
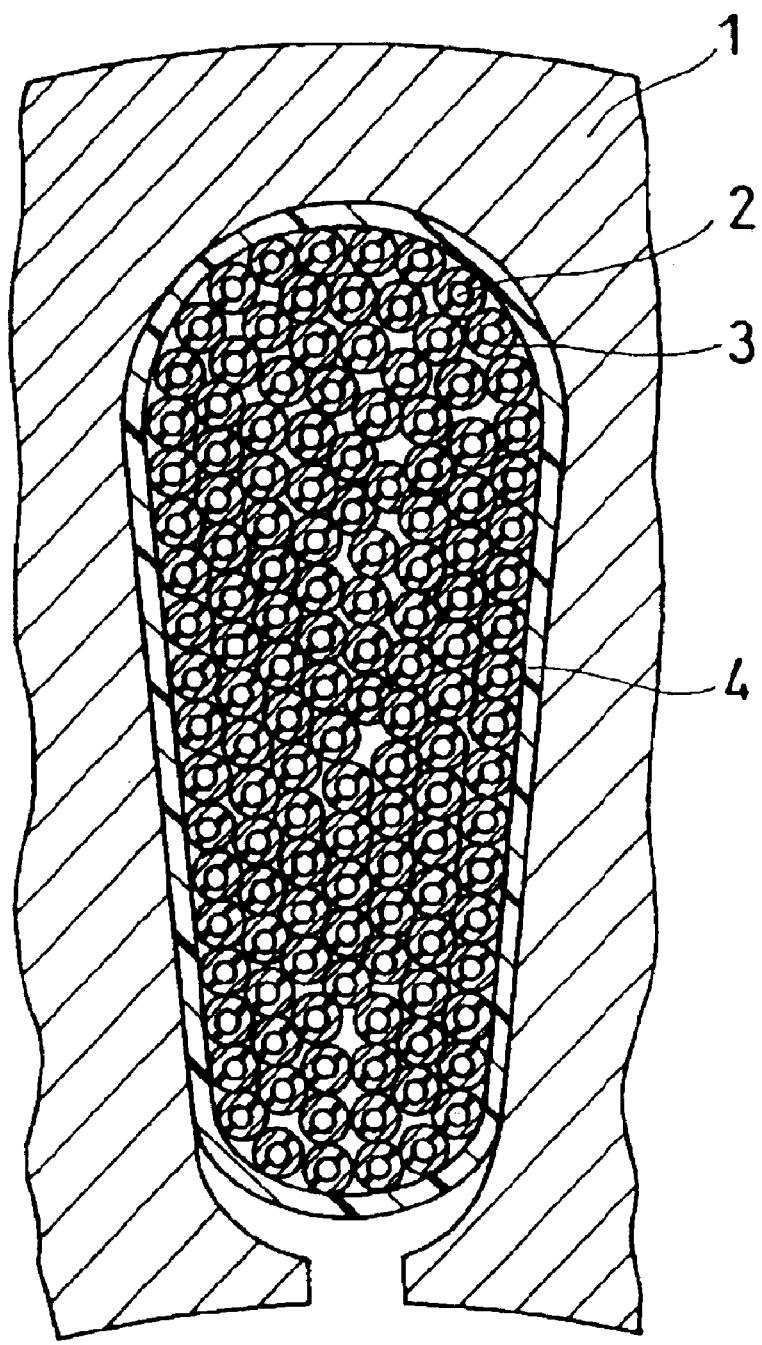
FIG. 1 is a schematic partial sectional view of an iron core containing a field coil in a rotator used for a compressor of the present invention.

In the following, embodiments of the present invention are described.

A common configuration of a compressor is described. A compressor comprises: a compression mechanism unit containing a working fluid which is a refrigerant and having a compression chamber for compressing the working fluid; a rotator; and a container for containing these components. Additionally, compressors can be divided into those of closed type and those of semi-closed type.

As electrical insulation parts in the compressor, for example, there are: a slot insulation part for insulating a field coil and a slot within the slot in the iron core of the rotator; a coil insulation part for covering the field coil; and a sheet insulation part for covering the entire rotator. The electrical insulation of the compressor is performed with a material used for the insulation part of the rotator and the working fluid. The insulation part of the rotator is generally formed from resin such as a thermoplastic resin, whereas the working fluid comprises a refrigerant and contains, as needed, a lubricating oil, additive and the like.

The present invention reduces the leakage current due to the working fluid, in addition to reducing the leakage current at the insulation part of the rotator, thereby providing a high-performance compressor and a refrigerant system device using the same. It should be noted that, as the compression system for the compressor, any of various systems such as reciprocating, rotary, scroll and linear systems may be used.

According to the present invention, it is possible to reduce the leakage current from the field coil by employing a low dielectric constant plastic film having a specific dielectric constant of 1.2 to 3.0 for the insulation part of the rotator in the compressor. As such low dielectric constant plastic film, a polyester film having pores therein, a fluorocarbon resin film, or a composite film obtained through lamination or the like is suitable for use.

Nevertheless, since the rotator in the compressor is under an atmosphere of the working fluid, in the case where the working fluid is a polar compound, the insulating property deteriorates with an increase in the dielectric constant of the rotator itself, thereby causing the current to leak easily. In the case where the film is used for the insulation part in the above-described manner, a gap or the like may occasionally be formed while the coil is being wound around the insulation part, and this gap may be filled with the polar working fluid, which may result in the creation of a polar atmosphere. In this case, even when the leakage current is suppressed with the low dielectric constant plastic film, it becomes likely that the current will leak in the gap and the effect of suppressing the leakage current may not be sufficiently achieved.

Therefore, the compressor in accordance with the present invention uses a nonpolar compound as the main component of the working fluid which determines the atmosphere of the rotator, in addition to forming the insulation part of the rotator from a low dielectric constant film, thereby making it possible to effectively reduce the leakage current as a whole.

The working fluid that can be effectively used in the present invention preferably comprises a nonpolar compound as the main component and contains a nonpolar solvent, for example, hydrocarbon compounds such as propane and isobutane, or carbon dioxide. It may also contain, as the working fluid, a refrigerant mixture comprising any of these compounds as the main component. When mixing them, the effect can be obtained by mixing the nonpolar refrigerants together, or adding a polar refrigerant such as hydrofluorocarbon. The "main component" as used herein generally refers to a component which constitutes not less than 50 wt % of the working fluid.

Also, in the case where the lubricating oil is further added to the working fluid, the effect of the present invention can be achieved by using either one of a nonpolar oil and a polar oil, because the working fluid comprises a nonpolar refrigerant as the main component. However, a polar oil has viscosity and thus may be accumulated in a gap in the insulation part of the rotor and, therefore it is preferable to use a lubricating oil comprising a nonpolar oil as the main component.

As such lubricating oil, any conventional one can be used, and the examples thereof include: nonpolar oils such as a mineral oil, poly-α-olefin oil, alkyl benzene oil and a mixture of these oils; and polar oils such as a polyol ester oil, polyvinylether oil, polyalkylene glycol oil, polycarbonate oil and a mixture of these oils. Further, a mixture of a nonpolar oil and a polar oil may also be used.

In a preferred mode of the compressor in accordance with the present invention, a working fluid containing a refrigerant comprising a hydrocarbon compound and a mineral oil as a lubricating oil is used, and the slot insulation part of the iron core in the rotor is formed from a polyester film having a specific dielectric constant of 2.0 to 2.8.

In another mode of the compressor, a working fluid containing: carbon dioxide as a refrigerant; and a mineral oil as a lubricating oil is used, and the slot insulation part of the rotor is formed from a fluorocarbon resin film having a specific dielectric constant of 2.0 to 2.8.

Next, the effect of the insulation part of the rotor is described.

Figure 3:
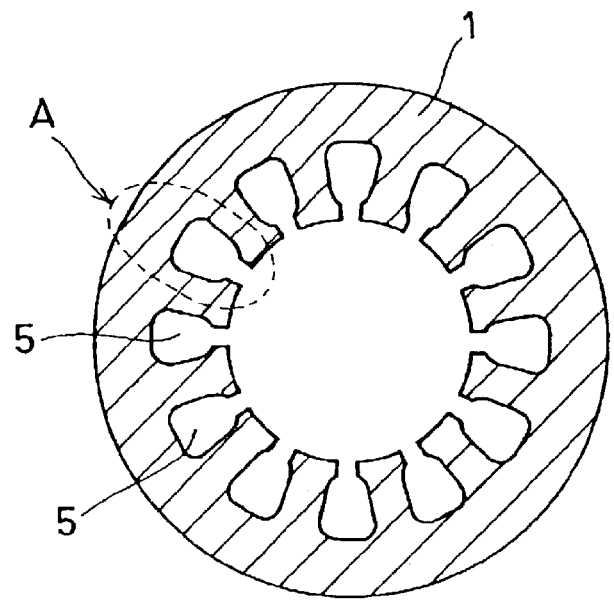
FIG. 3 is a schematic transverse sectional view of an iron core in a rotator used for a compressor.
Figure 4:
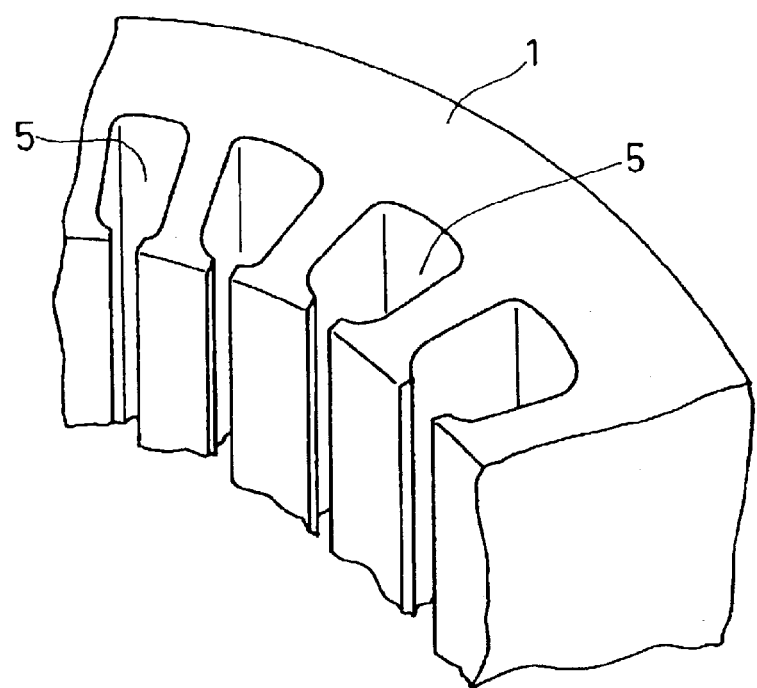
FIG. 4 is a schematic partial perspective view of an iron core in a rotator used for a compressor.

The insulation part as used in the present invention refers to a film insulation part for insulating a field coil wound around the slot and the inner surface of the slot, in the slot of the iron core in the rotor. Therefore, in FIG. 1, it refers to an insulation part 4 covering the outside of the coil and insulating the gap between the coil and the inner surface of the slot. It should be noted that an insulation part 3 for covering the coil itself is usually composed of enamel or the like. FIG. 1 corresponds to the portion of FIG. 3 indicated by "A" and is a schematic partial sectional view of an iron core including a field coil in a rotor used for the compressor of the present invention, showing the configuration of the slot.

By using a low dielectric constant plastic film having a specific dielectric constant of 1.2 to 3.0 as the material for forming this insulation part, it is possible to effectively reduce the leakage current. In order to obtain a practical film used for the slot insulation part in consideration of the moldability of the material, materials having a specific dielectric constant of 2.0 to 2.8 are preferably used.

In response to the use of high frequency for electric and electronic equipment, a plastic material is generally required to have electrical properties such as a low dielectric constant, low dielectric loss tangent and high withstand voltage. These electrical properties are gaining greater importance, since the following relation is met for the insulating material used for electronic and electrical equipment. This will be explained by reference to FIG. 1 and FIG. 2, taking a slot insulation part of the rotor as an example. Herein, although the dielectric constant may disperse depending on the frequency, comparison may be made for the mean value of the dielectric constant at least in the frequency range of from 60 Hz to 1 MHz.

In the case where a plastic film is used for an insulation part of an alternating current device, as represented by the equation (1):

$$P_{loss} = \propto f \cdot \epsilon r \cdot \tan\delta$$

a power loss "$P_{loss}$" leaking at the insulation part is proportional to the product of a frequency "f", specific dielectric constant "εr" and dielectric loss tangent "tan δ". Therefore, the power loss increases with an increase in frequency. In order to prevent this, it is necessary to lower the specific dielectric constant and to decrease the dielectric loss tangent. Additionally, as is also applied to the following discussion, the dielectric constant and the dielectric loss tangent has a dielectric dispersion which makes them to have different values depending on the frequency, and therefore it is also necessary that such variation be small within the operating frequency range.

Figure 2:
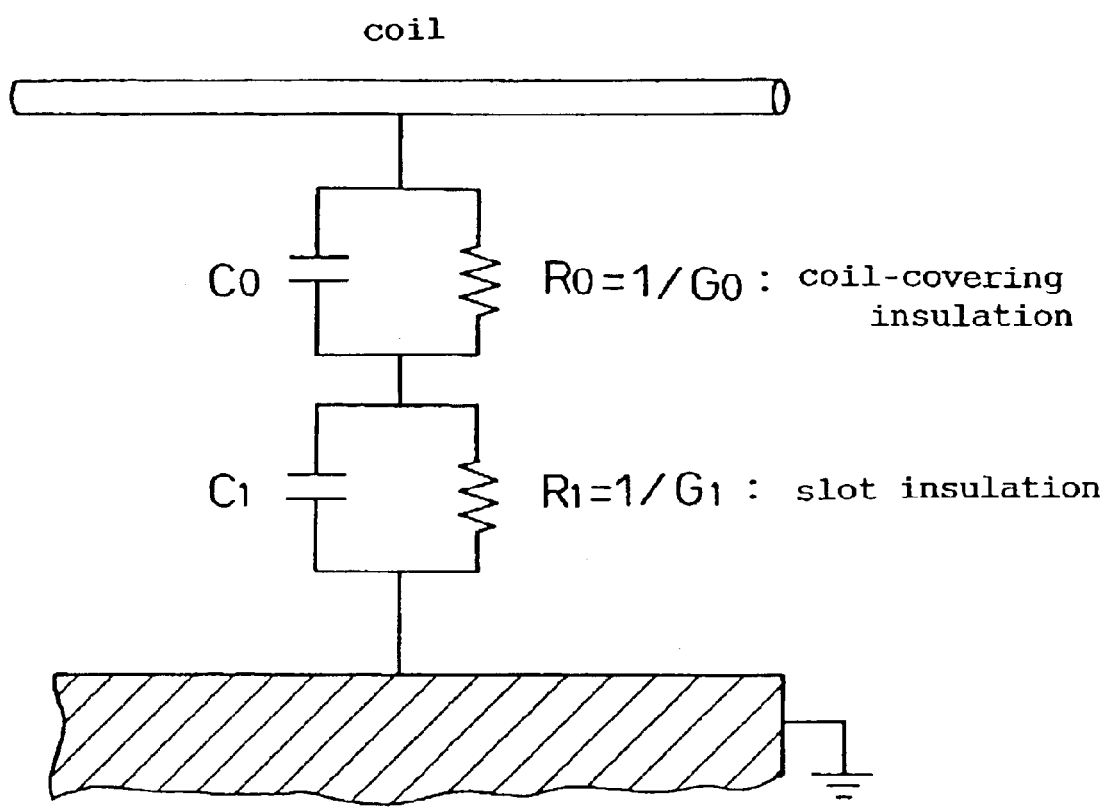
FIG. 2 is an equivalent circuit diagram for an electrical leakage at a slot insulation part of a rotator used for a compressor of the present invention.

The insulation part of the rotor having a configuration as shown in FIG. 1, which is similar to that of a common slot insulation part, is provided with a coil-covering insulation part 3 made of enamel or the like between a field coil 2, through which current flows, and an iron core 1, as well as a film insulation part 4 having an effect as a spacer. An equivalent circuit for a leakage of the alternating current between the field coil 2 and the iron core 1 is shown in FIG. 2. Herein, an impedance "Z" of the leakage current is represented by the equation (2):

$$Z = Z_0 + Z_1$$
$$= 1/(G_0 + j\omega C_0) + 1/(G_0 + j\omega C_0)$$

Herein, $j=\sqrt{(-1)}$, an angular frequency $\omega=2\pi f$, and "f" is an alternating current frequency. Further, $Z_0$, $G_0$ and $C_0$ are an impedance, conductance and capacitance of the coil-covering insulation part, respectively, and $Z_1$, $G_1$ and $C_1$ are an impedance, conductance and capacitance of the film insulation part of the slot insulation part, respectively. A square value of the magnitude of this impedance Z is represented by the equation (3):

$$|Z|^2 = \{G_0/(G_0^2+\omega^2 C_0^2)+G_1/(G_1^2+\omega^2 C_1^2)\}^2 + \omega^2 \cdot \{C_0/(G_0^2+\omega^2 C_0^2)+C_1/(G_1^2+\omega^2 C_1^2)\}^2$$

In the equation (3), where a dielectric loss tangent of the film insulation part inside the slot "$\tan\delta_1 = G_1/\omega C_1$" is smaller than 1, provided that the frequency is constant, i.e., "ω" is constant, and the magnitude of the impedance Z is monotonously decreased with increases in dielectric constant ε1 and capacitance C1 of the film insulation part. Therefore, since the relation "tanδ<1" is generally met in the case of a plastic film, the impedance increases with a reduction in the dielectric constant of the film and with an decrease in the dielectric loss tangent, whereby the leakage current is reduced at the slot insulation part of the rotor.

Also, it is known that an AC breakdown voltage "$E_{bd}$" of a plastic material is experimentally represented by the equation (4):

$$E_{bd} = A + B \cdot \log(\rho v/(\epsilon r \cdot \tan\delta))$$

and that a material having a lower specific dielectric constant and smaller dielectric loss tangent has a higher withstand voltage; accordingly, reducing the dielectric constant of the material resulting from high frequency will also improve the insulation property. It should be noted that, in the equation (4), A and B are constants and ρv is a volume resistivity.

As described above, selecting a low dielectric constant material as the insulation film used for the slot insulation part makes it possible to reduce the leakage current due to the use of higher-frequency equipment. However, it is necessary to consider which material is preferable to be selected. In this regard, a dielectric constant of a plastic material is determined by the molecular structure of the material, and represented by the Clausius-Mossotti equation (5):

$$\epsilon r = (1+2a)/(1-a)$$

Herein, in the equation (5), "a" satisfies "a=Pm/Vm". Also, "Pm" is a molar polarization, "Vm" is a molar volume, which are determined by the types of the respective functional groups, polarizability and symmetry of the molecule in the molecular structure of the plastic material. Accordingly, the dielectric constant of a material is determined as its inherent value. Herein, PTFE, which has only a C—F bond with small polarizability and is symmetric, has the smallest dielectric constant value among all plastic materials; however, the value is about 2.1, and there is a lower limit in selecting the material. In addition to this, other characteristics such as heat resistance and moldability for the installation into the slot are required, so that simply replacing the material is not sufficient.

Therefore, in the present invention, a polyester film having pores therein can be mainly used for a low dielectric constant plastic film as the insulation part of the rotator. Apart from polyester resins, polystyrene resins such as syndiotactic polystyrene and high impact polystyrene, polyamide resins such as Nylon 6 and Nylon 66, polyimide resins, fluorocarbon resins, polyether imide, polycarbonate, polyphenylene oxide, polyphenylene sulfide and polytrifluorochloroethylene may also be used. In the present invention, conventionally used aromatic polyester resins having good moldability are preferably used.

For example, a polyester material, which has been conventionally used as the slot insulation part between the iron core and field coil of the rotator, is selected and a polyester film having pores therein formed for reducing the dielectric constant of the insulation part is used to configure a rotator. In this configuration, a space which contains a gaseous content having an extremely smaller dielectric constant as compared with a solid content is present in the polyester film of the slot insulation part, so that the dielectric constant of the film becomes smaller than the bulk dielectric constant of the plastic. Such relation is approximately represented by the equation (6):

$$\epsilon r(f) = \epsilon r(g) \cdot Vg + \epsilon r(b) \cdot (1+Vg)$$

Herein, "$\epsilon r(f)$" is a specific dielectric constant of the film formed in the present invention, "$\epsilon r(g)$" is a specific dielectric constant of the gas in the space wherein a gas is present (in the case of air, 1) and "$\epsilon r(b)$" is a specific dielectric constant of the bulk plastic material. Additionally, "Vg" is a volume ratio of the space wherein a gas is present with respect to the entire plastic, and it corresponds to a porosity in the case of a porous plastic. For example, in the case of PET, although the specific dielectric constant of the bulk is, in general, about 3.1, it is about 2.8 in the case of a PET film in which air bubbles having a pore size of about 20 $\mu$m are uniformly formed at 10 vol % as voids. With the use of such porous PET film for the slot insulation part, the leakage of an alternating current in the rotator can be reduced by about 10% by merely reducing the dielectric constant.

As specific polyester resins, aromatic polyester such as polyethylene terephthalate (PET), polypropylene terephthalate (PPT), polybutylene terephthalate (PBT), polyethylene naphthalate (PEN) or one obtained by forming a polyester film so as to contain therein pores, such as crosslinked polyester used for improving the heat resistance, may be used.

In this film, the pore volume ratio is preferably 10 to 95 vol %. When it is less than 10 vol %, the effect of suppressing the dielectric constant is reduced, or, when it is more than 95 vol %, the strength and moldability of the film itself are degraded.

The pore size of the polyester film used in the present invention may be any given size as long as the dielectric constant resulting from the space can be reduced. However, a suitable film thickness to be put into practical use is generally in the range of 0.1 $\mu$m to 1 mm, preferably from 1 $\mu$m to 500 $\mu$m in terms of the moldability. Accordingly, in consideration of the effect of forming uniformly distributed pores or preventing the entry of the working fluid such as a refrigerant or a lubricating oil, a suitable mean pore size is not more than 50 $\mu$m, preferably 0.1 to 10 $\mu$m. Although the pores may be in the form of either open cell in which pores are successively communicated or closed cells in which pores are present independently, the closed cells are preferable for preventing the impregnation with liquid, the influence of humidity and the like. In the case of the closed cells, the closed-cell ratio is preferably not less than 80%.

With regard to the method of producing a polyester film comprising pores therein, which is used in the present invention, one that has been produced by any one of various methods may be employed as long as the heat resistance, moldability, electrical properties are satisfied. In order to provide a porous structure capable of yielding particularly suitable properties, common foaming techniques employing a foaming agent, an orientation treatment and the like may be used. Examples of a specific pore forming method are as follows.

(1) A foaming method that involves molding a thermoplastic resin composition containing a foaming agent into a film and then applying thereto energy such as heat.

(2) A foaming method that involves swelling, with a foaming agent, a thermoplastic resin to be used as the starting material or a plastic film obtained therefrom, and then vaporizing liquid in the form of film.

(3) A foaming method that involves absorbing and dissolving a foaming gas into a plastic film to be used as the starting material, and then performing vaporization by releasing the pressure under reduced or ordinary pressure, or by applying thermal energy.

(4) A pore forming method that involves adding foaming nucleuses in a thermoplastic resin to be used as the starting material, and performing an orientation treatment, such as drawing, on the mixture during molding or after molding it into a film.

Apart from these methods, other various methods are available, including: a method that involves mechanically mixing a gas into plastic; and a method that involves mixing another pore forming material into plastic and removing the material with a solvent. Additionally, as the foaming gas used during foaming, water, organic compound of low-boiling point or the like may be used, and an inert gas such as helium, argon or xenon or a gas such as nitrogen, oxygen, air or carbon dioxide may also be used. Particularly, carbon dioxide is preferable, because it has no reactivity with plastic as well as having high permeability thereto and thus can readily permeate through plastic in a highly pressurized liquid state and can be sufficiently dissolved therein in a supercritical fluid state, and it is suitable because it can be absorbed in a relatively large amount and thus the foaming can be easily controlled even in the state of ordinary temperature and pressure.

Moreover, in the present invention, a fluorocarbon resin film may be mainly used for the low dielectric constant plastic film as the insulation part of the rotator. A fluorocarbon resin exhibits a low dielectric constant because its molecular structure includes a C—F bond as a bond with small polarizability.

As a specific fluorocarbon resin, it is possible to use any of commercially available general-purpose resins containing fluorine, for example: polytetrafluoroethylene (PTFE), which is a homopolymer of tetrafluoroethylene (TFE); a polytetrafluoroethylene-perfluoroalkylvinyl copolymer (PFA), which is a copolymer of TFE and perfluoroalkylvinylether; a polytetrafluoroethylene-polyhexafluoropropylene copolymer (FEP), which is a copolymer of TFE and hexafluoropropylene; a polytetrafluoroethylene-ethylene copolymer (ETFE), which is an alternating copolymer of TFE and ethylene; polychlorotrifluoroethylene (PCTFE), which is a homopolymer of trifluorochloroethylene; polyvinylidene fluoride, which is a homopolymer of vinylidene fluoride (PVDF); a polytrifluoroethylene-ethylene copolymer (ECTFE); polyvinyl fluoride (PVF); and a cyclized polymer of perfluoroalkenylvinylether (CYTOP manufactured by Asahi Glass Co., Ltd.)

A fluorocarbon resin may be used singly for the insulation part, or may be combined with other resins. For example, there are methods of using, as a base film, polyester, which has conventionally been used for the slot insulation part for the iron core and field coil of the rotator and combining a polyester resin and a fluorocarbon resin: for example, a method that involves laminating a polyester film and a fluorocarbon resin film; and a method that involves dispersing a fluorocarbon resin in a polyester film.

The dielectric constant of a composite film obtained by laminating a polyester film and a fluorocarbon resin film is reduced by the fluorocarbon resin having a dielectric constant lower than that of polyester, and is represented by the equation (7)

$$\epsilon f = \epsilon(F) \cdot \epsilon(E) \cdot (dF + dE)/(\epsilon(F) \cdot dE + \epsilon(E) \cdot dF)$$

Herein, "$\epsilon f$" is a dielectric constant of a multilayered composite film formed in the present invention, comprising a fluorocarbon resin and a polyester film, "$\epsilon(F)$" and "dF" are a dielectric constant of the fluorocarbon resin and the total thickness of the multilayered composite film, respectively, and "$\epsilon(E)$" and "dE" are a dielectric constant of the polyester resin and the total thickness of the multilayered composite film. With the use of this composite film obtained by lamination, a fluorocarbon resin, which has not conventionally possessed a degree of moldability required during the insertion of the film into the slot insulation part despite of its relatively low dielectric constant, is able to be provided with a degree of moldability similar to that of the polyester film and thereby forming the slot insulation part.

Particularly, an excellent effect is produced by either sandwiching a fluorocarbon resin film by polyester films or laminating the both in an alternating manner. In addition, the laminating the both yields a further stable moldability. In order to form a composite film, a plurality of films may be laminated to yield a multilayered structure. As the method for tightly attaching the both, they may be laminated via a heat-resistant adhesion layer, or may be laminated while applying heat thereto, as in a heat extrusion.

In general, a film thickness applicable to practical use is in the range of about 0.1 μm to 1 mm. However, the total thickness for use is preferably from 100 μm to 500 μm. In order to achieve moldability after the lamination, the suitable range is from 1 μm to 100 μm for a fluorocarbon resin film, and the thickness of a polyester film is adjusted, for example, for adjusting the total thickness, providing moldability and obtaining a desired dielectric constant.

Further, the dielectric constant of a composite film, obtained by dispersing a fluorocarbon resin in a polyester film, is reduced by the fluorocarbon resin. In this structure, since there is present a fluorocarbon resin portion having a low dielectric constant in the polyester film of the slot insulation part, the dielectric constant of the film as a whole is reduced to lower than the bulk dielectric constant of the polyester film alone. This relation is approximately represented by the equation (8):

$$\epsilon f = \epsilon(F) \cdot VF + \epsilon(E) \cdot (1 + VF)$$

Herein, "$\epsilon f$" is a dielectric constant of the composite film, obtained by dispersing a fluorocarbon resin in a polyester film formed in the present invention, "$\epsilon(F)$" is a dielectric constant of the dispersed fluorocarbon resin and "$\epsilon(E)$" is a dielectric constant of the polyester resin. Additionally, "VF" is a volume ratio of the portion occupied by the dispersed fluorocarbon resin with respect to the entire film.

Further, when at least one of the polyester resin and the fluorocarbon resin that are to be combined has a porous structure, the dielectric constant of the film can be further reduced, and it is possible to configure the rotator having less power loss at the slot insulation part. At this time, when the porous structure is a foamed structure with closed cells, an effect of preventing the entry of liquid can be achieved, for example, when the rotator is used while being impregnated with a refrigerant liquid or oil liquid.

Further, in the present invention, it is suitable to use, as the low dielectric constant plastic film, a laminated composite film comprising a base film having a low dielectric constant and an auxiliary film having a dielectric constant higher than the dielectric constant of this base film, because it improves the moldability. As such structure, for example, there are: the above-described laminated film comprising a polyester resin film and a fluorocarbon resin film; and a multilayered film comprising a porous polyester film having pores with a volume ratio of not less than 10 vol % and either one of a polyester film having no pore therein and a polyester film having a pore volume ratio of not more than 10 vol %. This structure enables the effect of reducing the leakage current at high frequency to be sufficiently exerted. Further, it is more effective to block the sides of the film for preventing the permeation of liquid substance into the gap.

As the material for the auxiliary film, it is possible to use polyester resins, polystyrene resins such as a syndiotactic polystyrene and high impact polystyrene, polyamide resins such as Nylon 6 and Nylon 66, polyimide resins, fluorocarbon resins, polyetherimide, polycarbonate, polyphenylene oxide, polyphenylene sulfide, polytrifluorochloroethylene and the like.

Also, the portion of the film either having no pore or having a porosity of not more than 10 vol % may also be a skin layer which is formed on a film, apart from a multilayered structure. In an applicable method to obtain such a layer, a skin film layer having gradually arranged pore sizes is formed by clamping the both surfaces of the film with a jig having smooth planes during the pore formation.

Further, for the slot insulation part of the rotator of the present invention, a multilayered film comprising a plurality of the above-described films may also be used.

In addition, as the film member of the present invention, a polyester member having a gap may be used. For example, a woven fabric made of polyester fiber having a heat resistance at not lower than 100° C. may be used as a gap forming member. In order to form a film, a gap may be formed, for example, by sandwiching the above-described member by regular polyester films having no gap. This makes it possible to obtain a slot insulation part having an excellent adhesion with the iron core portion, field coil and the like, high insulation, excellent moldability and high heat resistance temperature. As such a member, for example, a woven fabric made of plastic fiber such as polyester mesh used for the screen printing may be used, and apart from this, it is possible to employ any structure capable of maintaining a space by using, as the support, polyester films sandwiching the both surfaces of the above-described member; for example, a polyester film having a gap produced by irregularities formed thereon through embossing or the like, and a structure filled with plastic particles, honeycomb structure, wave-form structure and zigzag structure.

The refrigerant system device in accordance with the present invention is configured by combining the compressor of the present invention with a pipe, heat exchanger, expansion valve or capillary. Although the atmosphere of the working fluid in the compressor changes in pressure, temperature, the amount of the refrigerant, the amount of the lubricating oil, the component ratio and the like depending on the operation of the system device, the effect of reducing the leakage current can be obtained in any operation mode.

EXAMPLE 1

COMPARATIVE EXAMPLE 1

A porous polyester film of polyethylene terephthalate (PET) having a pore volume ratio of 30 vol % was used to form a film insulation part of a slot insulation part, at an iron core of a rotator having the same configuration as shown in FIG. 1. Subsequently, a condenser, expansion valve and evaporator were connected by means of pipes to a compressor employing this rotator as well as propane and a mineral oil as the refrigerant and lubricating oil, respectively, of the working fluid, thereby configuring a refrigerant system device (Example 1).

The film thickness was 350 $\mu$m at this time, and the sizes of the pores were in the range of from about 5 $\mu$m to about 50 $\mu$m, whereas the mean pore size was about 10 $\mu$m. In addition, the average specific dielectric constant of the film in the frequency range of from 60 Hz to 100 kHz was about 2.5.

The leakage current between the device and the ground during the operation of this refrigerant system device was measured for evaluation.

In order to examine the effect of reducing the leakage current, a comparative refrigerant system device (Comparative Example 1) as a reference system was configured in the same manner, except for using a pore-free PET film (film thickness of 350 $\mu$m, specific dielectric constant of about 3.2) for the film insulation of the rotator, as well as 1,1,1,2-tetrafluoroethylene (HFC 134a) and a polyol ester oil as the refrigerant and lubricating oil, respectively, of the working fluid, and the device was operated under the same conditions to measure the leakage current for evaluation and comparison.

With respect to the leakage current 100 in the reference system, the leakage current in the configuration of the present example was reduced to about 80, achieving an about 20% reduction.

COMPARATIVE EXAMPLE 2

A refrigerant system device was configured in the manner as in Example 1 using a rotator employing the same low dielectric constant film as in Example 1 for the film insulation of the slot insulation part, except for using HFC 134a and a polyol ester oil as the refrigerant and lubricating oil, respectively, of the working fluid, and the device was operated under the same conditions to measure the leakage current between the device and the ground for evaluation.

With respect to the leakage current 100 in the comparative reference system, the leakage current in the configuration of the present invention was reduced to about 95, yielding only an about 5% reduction. The reason was presumably that, although the low dielectric constant film produced some effect, the effect was not sufficiently achieved owing to the influence by the working fluid.

EXAMPLE 2

A refrigerant system device was configured in the same manner as in Example 1, except for using a rotator employing a composite film obtained by laminating three sheets of polytetrafluoroethylene films each having an average thickness of about 120 $\mu$m to have the total thickness of about 360 $\mu$m for the slot insulation of a slot insulation part, as well as carbon dioxide and a mineral oil as the refrigerant and lubricating oil, respectively, of the working fluid, and the device was operated under the same conditions to measure the leakage current between the device and the ground for evaluation.

At this time, the specific dielectric constant of the film in the frequency range of from 60 Hz to 100 kHz was about 2.1.

With respect to the leakage current 100 in the comparative reference system, the leakage current in the configuration of the present example was reduced to about 65, achieving an about 35% reduction.

EXAMPLE 3

A laminated multilayered film, obtained by sandwiching a porous polyethylene naphthalate (PEN) film having a film thickness of 250 $\mu$m, a specific dielectric constant of about 2.5 at a test frequency of 10 kHz and a porosity of 20 vol % by two sheets of PET films having a thickness of 10 $\mu$m, was used for the film insulation of the rotator. At this time, a specific dielectric constant of about 2.7 was obtained for the multilayered film.

A refrigerant system device was configured in the same manner as in Example 1, except for using a rotator employing this film for the film insulation of the slot insulation part, as well as isobutane and a mineral oil as the refrigerant and lubricating oil, respectively, of the working fluid, and the device was operated under the same conditions to measure the leakage current between the device and the ground. At this time, the leakage current was about 88 with respect to that of the comparative reference system, achieving an about 12% reduction in the leakage current.

EXAMPLE 4

A multilayered composite film, obtained by sandwiching four sheets of polytetrafluoroethylene-ethylene copolymer (ETFE) films each having a film thickness of 20 $\mu$m and a dielectric constant of 2.6 by five sheets of PEN films each having a film thickness of 30 $\mu$m and a dielectric constant of 2.9 in an alternating manner, was used for the film insulation of the rotator. The total film thickness was 230 $\mu$at this time, and the specific dielectric constant was about 2.8 at a test frequency of 1 kHz. It should be noted that forming the film into such a multilayered structure did not cause any extreme rupture of the ETFE film during the processing in the manufacturing of the rotator.

A refrigerant system device was configured in the same manner in Example 1, except for using this rotator, as well as carbon dioxide and a mixture of a mineral oil and an alkyl benzene oil as the refrigerant and lubricating oil, respectively, of the working fluid, and the device was operated under the same conditions to measure the leakage current between the device and the ground for evaluation.

With respect to the leakage current 100 in the comparative reference system, the leakage current in the configuration of the present example was reduced to about 90, achieving an about 10% reduction.

EXAMPLE 5

A polyester film having a film thickness of 350 $\mu$m and a pore volume ratio of 20 volt, obtained by biaxially stretching a PET film filled with foaming nucleuses, was used. At this time, the specific dielectric constant of this film was about 2.8 at a test frequency of 1 kHz. A refrigerant system device was configured in the same manner as in Example 1, except for using a rotator employing this film, as well as propane and a polycarbonate oil as the refrigerant and lubricating oil, respectively, of the working fluid, and the device was operated under the same conditions to measure the leakage current between the device and the ground for evaluation.

With respect to the leakage current 100 in the comparative reference system, the leakage current in the configuration of the present example was decreased to about 90, achieving an about 10% reduction.

INDUSTRIAL APPLICABILITY

As is clear from the above, the compressor of the present invention and the refrigerant system device using the same employ a nonpolar working fluid, in addition to using a low dielectric constant plastic film having pores therein for the insulation part of the rotator, thereby making it possible to efficiently reduce alternating current components in the leakage current in the compressor while maintaining the insulating property; accordingly it is possible to reduce the leakage current in the system device itself. As a result, it becomes possible to reduce power loss and to provide a highly safe and reliable refrigerant system device.

In response to the increasing use of high-frequency electric and electronic equipment in the future, the present invention further promotes efficiency such as energy-savings while contributing to the realization of compactness and cost reduction, and therefore the present invention has a significant industrial value.

What is claimed is:

1. A refrigerant system device comprising a compressor including a compression mechanism unit, said compressor being characterized in that a nonpolar refrigerant is used as a working fluid and an insulation part of a rotating section is formed from a low dielectric constant plastic film having a specific dielectric constant of 1.2 to 3.0.

2. The refrigerant system device in accordance with claim 1, wherein said nonpolar refrigerant contains at least one of propane and isobutane.

3. The refrigerant system device in accordance with claim 1, wherein said nonpolar refrigerant is carbon dioxide.

4. The refrigerant system device in accordance with claim 1, wherein said working fluid contains a nonpolar oil as a lubricating oil.

5. The refrigerant system device in accordance with claim 4, wherein said nonpolar oil is a mineral oil.

6. The refrigerant system device in accordance with claim 1, wherein said low dielectric constant plastic film is a polyester film having pores therein.

7. The refrigerant system device in accordance with claim 6, wherein said film has a pore volume ratio of 10 to 95 vol %.

8. The refrigerant system device in accordance with claim 7, wherein said pores have a mean pore size of 0.1 to 10 $\mu$m.

9. The refrigerant system device in accordance with claim 1, wherein said low dielectric constant plastic film is a fluorocarbon resin film.

10. The refrigerant system device in accordance with claim 6, wherein said low dielectric constant plastic film is a laminated composite film comprising a base film having a low dielectric constant and an auxiliary film having a higher dielectric constant than said base film.

11. The refrigerant system device in accordance with claim 6, wherein said low dielectric constant plastic film has a specific dielectric constant of 2.0 to 2.8.

12. The refrigerant system device in accordance with claim 1, wherein said low dielectric constant plastic film forms at an iron core of said rotating section, an insulation part for insulating a field coil and a slot.

* * * * *